United States Patent [19]

Okada et al.

[11] Patent Number: 4,825,299

[45] Date of Patent: Apr. 25, 1989

[54] MAGNETIC RECORDING/REPRODUCING APPARATUS UTILIZING PHASE COMPARATOR

[75] Inventors: Yoshinori Okada; Shigemitsu Higuchi; Hiroaki Takahashi; Yasufumi Yunde; Takashi Furuhata, all of Kanagawa, Japan

[73] Assignee: Hitachi, Ltd., Tokyo, Japan

[21] Appl. No.: 91,452

[22] Filed: Aug. 31, 1987

[30] Foreign Application Priority Data

Aug. 29, 1986 [JP] Japan ................................ 61-201423

[51] Int. Cl.$^4$ .............................................. H04N 9/89
[52] U.S. Cl. ..................................... 358/323; 358/330
[58] Field of Search ............... 358/310, 320, 323, 328, 358/330, 337, 326; 360/36.1, 24

[56] References Cited

U.S. PATENT DOCUMENTS

| | | | |
|---|---|---|---|
| 4,100,567 | 7/1978 | Yoshinaka | 358/324 |
| 4,145,705 | 3/1979 | Yoshinaka | 358/326 |
| 4,490,749 | 12/1984 | Hirota | 358/330 |
| 4,672,470 | 6/1987 | Morimoto et al. | 358/323 |
| 4,704,639 | 11/1987 | Yamanishi et al. | 358/330 |

FOREIGN PATENT DOCUMENTS

| | | | |
|---|---|---|---|
| 52-36921 | 3/1977 | Japan | 358/323 |
| 52-75222 | 6/1977 | Japan | 358/323 |
| 60-127895 | 8/1985 | Japan | 358/323 |

*Primary Examiner*—Donald McElheny, Jr.
*Attorney, Agent, or Firm*—Antonelli, Terry & Wands

[57] ABSTRACT

A magnetic video recording/reproducing apparatus of high resolution, which excludes a phase difference introduced to a signal due to difference in characteristics between a low frequency conversion system and a high frequency conversion system by inserting an additonal signal to both systems. The additional signal is recorded together with the video signal and a phase difference is detected. The detected phase difference is utilized for regulating the phase difference in the respective frequency systems.

8 Claims, 14 Drawing Sheets

MAGNETIC RECORDING/REPRODUCING APPARATUS UTILIZING PHASE COMPARATOR

BACKGROUND OF THE INVENTION

The present invention relates to an improvement of a magnetic recording/reproducing apparatus and, particularly, to a magnetic recording/reproducing apparatus suitable to record/reproduce a video signal of wide frequency band, which contains highly fine information.

The so-called video tape recorder (VTR) is well known as a magnetic recording/reproducing apparatus for home use, which utilizes a magnetic tape as a recording medium. In such VTR for home use (referred to as H-VTR hereinafter), in order to realize a long time recording with minimum tape consumption, a low frequency conversion color process is utilized in which a video signal, e.g., NTSC color signal, is divided into a high frequency component including a chrominance signal and a luminance signal and a low frequency component including a luminance signal. The high frequency component is frequency-converted into a low frequency band. The low frequency component is frequency-modulated. The high frequency component whose frequency is lowered and the frequency-modulated low frequency component are added to each other and recorded, as disclosed in Japanese Patent Publication No. 28613/1970.

In the H-VTR of a cross azimuth, guard bandless system, a high frequency luminance signal chroma signal cross-talk between adjacent tracks is prevented by recording the video signal after the high frequency luminance signal is completely removed by passing it through a comb filter. In the H-VTR of a slanted azimuth guard bandless system, a problem of cross-talk between adjacent tracks of the low frequency converted signal is solved by a chrominance signal processing, i.e., the so-called phase shift (PS) processing as disclosed in U.S. Pat. No. 4,178,606, together with the employment of the comb filter in a reproducing operation.

The use of comb filter which removes the luminance signal from the high frequency component causes a horizontal resolution of the video signal which is about 330 lines at an input of the H-VTR to be lowered to 230 to 250 lines.

In order to resolve this problem, it may be possible to record/reproduce the luminance signal of the high frequency component together with the chrominance signal thereof while overcoming the inter-track interference problem by means of a recording system using a guard band. In such case, however, when the respective signal components processed in the respective signal processing systems are combined again, a resultant luminance signal is not always continuous over the whole luminance frequency range due to possible phase difference between the signal components introduced thereinto in the respective processing systems.

Furthermore, for a phase variation introduced by mechanical driving systems of the tape and the head, an output of a reference color subcarrier frequency oscillator is compared in phase with a color sub-carrier of the chrominance signal to control an output frequency of a frequency-conversion local oscillator such that the color signal frequency of the chrominance signal becomes stable during a recovery of the luminance signal in the high frequency component from the reproduced signal by means of the frequency conversion to thereby obtain a satisfactory color image quality (APC system). However, since such time base correction or phase correction is not performed for the luminance signal of the low frequency component, the high frequency luminance signal component and the low frequency luminance signal component, when combined together again, are not always continuous.

In order to resolve the latter problem, it has been proposed to correct the time base variation by obtaining time base variation signal from a reproduced horizontal synchronizing signal or color burst signal and processing it by means of a variable delay line or a digital memory including an A/D converter and a D/A converter. In such system, however, since a S/N ratio of the horizontal synchronizing signal or color burst signal is poor, it is very difficult to correct the time base variation precisely.

SUMMARY OF THE INVENTION

An object of the present invention is to overcome the problem of the discontinuity of the reproduced luminance signal over the full frequency range thereof.

According to an aspect of the present invention, the object is achieved by a magnetic video recording/reproducing apparatus of high resolution, which excludes phase difference introduced to the signal due to difference in characteristics between the low frequency conversion system and the FM system by inserting an additional signal to both systems.

According to another aspect of the present invention, the above object is achieved by a provision of means for recording, together with the video signal, an additional signal, in the form of pilot signal, for detection of phase difference, means for detecting, from a reproduced pilot signal, phase difference given to them by the low frequency system and the high frequency system of the reproducing system and means for regulating the phase difference between both signals in the respective frequency systems.

According to a further aspect of the present invention, the above object is achieved by providing, in each of the high frequency system and the low frequency system of the reproducing system, a time base correction system composed of an A/D converter, a memory, a D/A converter and an address control circuit for controlling write address and read address of the memory. In a recording operation, a color burst signal of the low frequency converted high frequency signal is extracted and added preliminarily to the low frequency system in a time period determined by a synchronizing signal in the low frequency system and, in a reproducing operation, the additional signal or a reproduced burst signal is used to produce a sampling clock for the A/D converters. Further, a reference frequency signal generator such as crystal oscillator produces a readout clock for the memories and the additional signal and the signal of the low frequency conversion system are used to control the phase discontinuity between the reproduced signals of the high frequency system and the low frequency conversion system.

The time period of the low frequency conversion signal on which the additional signal is produced can be increased to make the time base correction more precise.

The signal of the low frequency conversion system which has an extended time period or the additional signal contains precise information of the time base variation or phase difference produced in the recording-/reproducing system and, by using such additional or widened signal as a write clock for the A/D converters and the memories, the time base variation is corrected and stored in the memories. The stored variation is then readout from the memories at a constant clock from the reference frequency generator and the D/A converter. Therefore, a video signal whose time base variation is substantially corrected is obtained. Further, the additional signal is compared with the signal of the low frequency conversion system to control the phase of either of the signals.

DETAILED DESCRIPTION OF THE PREFERRED EMBODIMENTS

Figure 1:
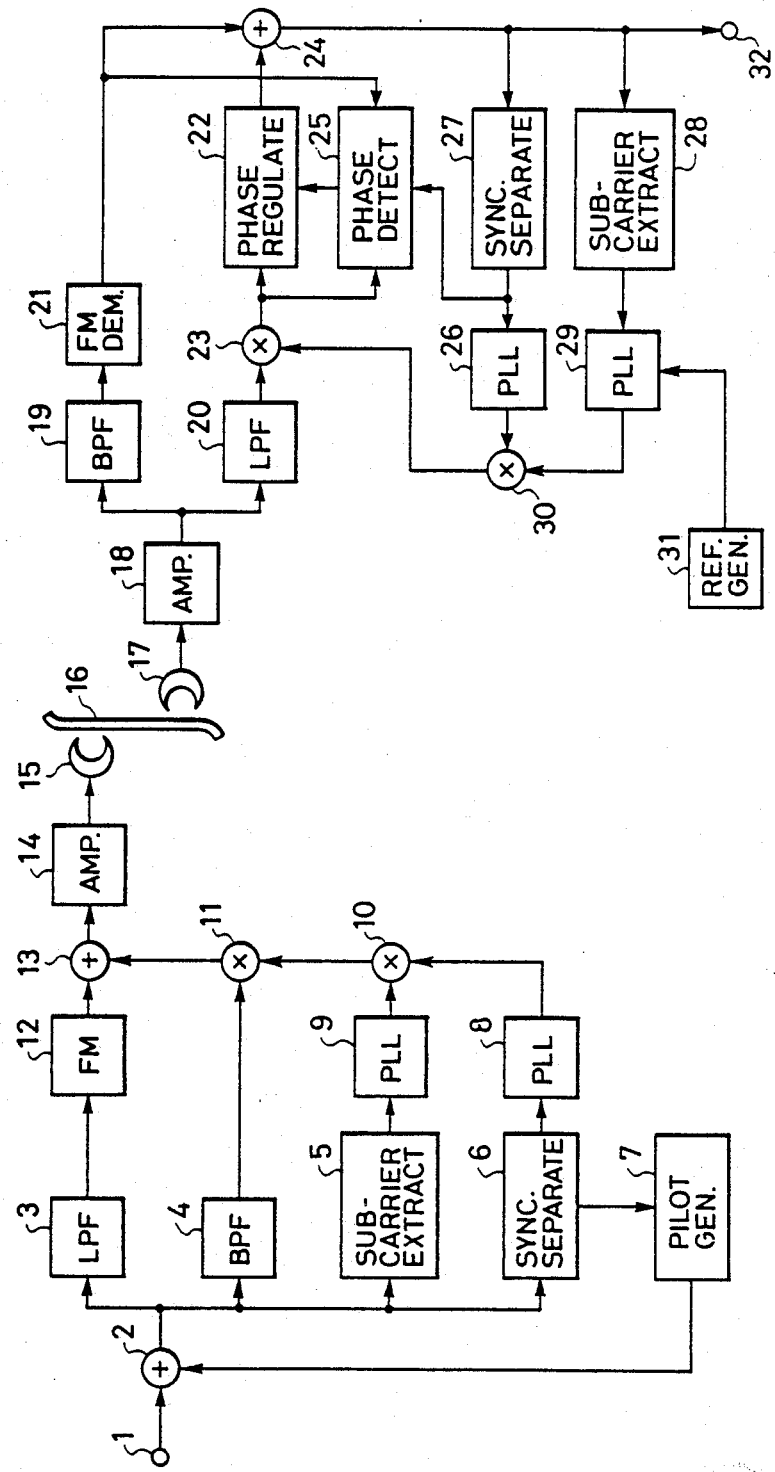
FIG. 1 is a block diagram of the video tape recorder incorporating an embodiment of the present invention.

FIG. 1 is a block circuit diagram of an embodiment of the present invention in which a portion on a left side of a magnetic video tape 16 is a recording system and a right side portion shows a reproducing system. The recording system has a video signal input terminal 1, an adder 2, a low-pass filter (LPF) 3, a band-pass filter (BPF) 4, a color sub-carrier extracting circuit 5, a synchronizing signal separator 6, a pilot signal generator 7, phase locked loop (PLL) oscillators 8 and 9, frequency converters 10 and 11, a frequency modulator (FM) 12, an adder 13, an amplifier 14 and a magnetic head 15. The reproducing system comprises a magnetic head 17, an amplifier 18, a BPF 19, an LPF 20, a frequency demodulator 21, a phase regulator 22, frequency converters 23 and 30, an adder 24, a phase difference detector 25, PLL circuits 26 and 29, a synchronizing signal detector 27, a color burst extractor 28, a reference signal generator 31 and a video signal output terminal 32.

Figure 2:
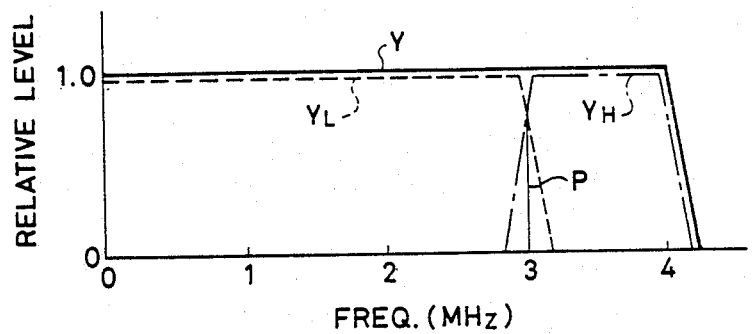
FIG. 2 illustrates a frequency division principle of the video tape recorder in FIG. 1.

Before describing an operation of the present invention, a band division of video signal frequency band will be described briefly with reference to FIG. 2. In FIG. 2, a video signal Y is divided into a signal component $Y_L$ of a low frequency region and a signal $Y_H$ of a high frequency region. When the signal Y is a NTSC color signal, the signal $Y_H$ contains a luminance signal and a substantial portion of chrominance signal obtained by orthogonally modulating a color sub-carrier of $f_{sc}$ (=3.45 MHz), a remaining portion of which is contained in the signal $Y_L$ containing a luminance signal. A vertical line P shows a spectrum of a pilot signal to be described.

As is clear from FIG. 2, the pilot signal frequency is selected, according to the present invention, at a frequency around a cross portion of characteristics of the LPF 3 and the BPF 4 and still lower than an upper cut-off frequency of the LPF 3 and higher than a lower cut-off frequency of the BPF 4.

With such pilot signal frequency selected at around the cross point of the frequency bands of the filters 3 and 4, the pilot signal frequency is included in both the frequency regions after division into regions. Therefore, it is possible to detect a difference in phase between signals to be passed through the respective signal processing systems by comparing those of the pilot signals.

In FIG. 1, a pilot signal from the pilot signal generator 7 is added by the adder 2 to a signal Y supplied to the video signal input terminal 1 and a resultant signal is frequency-divided by the LPF 3 and the BPF 4 into the signal components $Y_L$ and $Y_H$, respectively, as shown in FIG. 2. Since the pilot signal frequency is set around the upper and lower cut-off frequencies of the LPF 3 and the BPF 4, the pilot signal is included in both the signals $Y_L$ and $Y_H$, as mentioned above.

The pilot signal is inserted prior to the division of the signal frequency band so that a difference between delay times introduced to the signal components by the LPF 3 and the BPF 4 can be detected and compensated for. If such difference is previously known, it is possible to insert the pilot signal after the band division so long as an operation of a circuit for regulating the delay time difference is corrected according to the difference. However, the latter approach may make a signal processing circuit therefor complicated.

The signal $Y_L$ is frequency-modulated by the FM circuit 12, resulting in an $Y_L'$ signal. The $Y_H$ signal is frequency-converted by the frequency converter 11 to a low frequency signal $Y_H'$. The signal $Y_L'$ and $Y_H'$ are added to each other by the adder 13, amplified by the amplifier 14 and recorded by the magnetic head 15.

The PLL circuit 9 oscillates a color sub-carrier frequency ($f_{sc}$) continuously on the basis of a color sub-carrier extracted by the color sub-carrier extracter 5 and the PLL circuit 8 produces a continuous signal of frequency 40 $f_H$ where $f_H$ is frequency of the horizontal synchronizing signal separated from the synchronizing signal separator 6. The frequencies $f_{sc}$ and 40 $f_H$ from the PLL circuit 8 and 9 are added by the frequency converter 10 an output of which is used as another input of the frequency converter 11 in which calculation is performed to frequency-convert the sub-carrier frequency $f_{sc}$.

$$(f_{sc}+40\,f_H)-f_{sc}=40\,f_H$$

and the resultant signal of $40 \times f_H$ is recorded together with the signal $Y_L'$ after being amplified by the amplifier 14.

Figure 3:
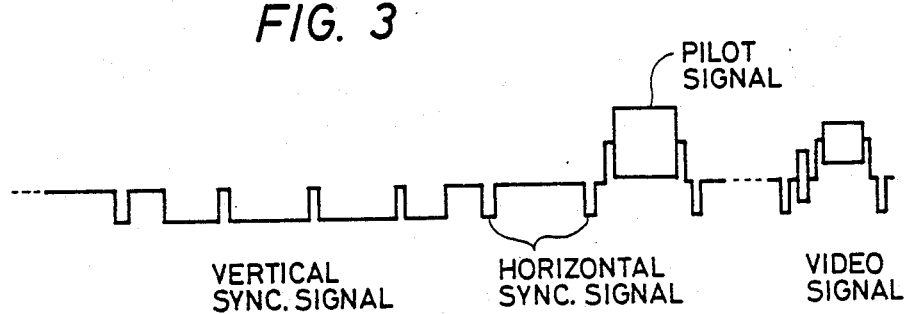
FIG. 3 illustrates an insertion of a pilot signal according to the present invention.

The pilot signal generator 7 responds to the synchronizing signal from the separator 6 to produce the pilot signal in the form of a burst at a timing shown in FIG. 3 such that it is inserted into a horizontal scan period within a vertical blanking period.

In the reproducing system, a signal recorded on the magnetic tape is reproduced by the magnetic head 17 and amplified by the amplifier 18. The amplified signals $Y_L'$ and $Y_{Y'}$ are separated by the BPF 19 and the LPF 20, respectively. The signal $Y_L'$ is frequency-demodulated by the frequency demodulator 21, resulting in $Y_L$ signal. The signal $Y_H'$ is frequency-converted by the frequency converter 23, resulting in the $Y_H$ signal. The signals $Y_H$ and $Y_L$ are supplied to the phase difference detector 25 by which phase difference between these signals are detected. A result of the detection is supplied to the phase regulator 22 and regulated thereby so that the difference is removed. The signals $Y_L$ and $Y_H$ which are in phase are added to each other by the adder 24 and provided as a Y signal at the video signal output terminal 32 for display. The operation of the phase regulator 22 will be described later.

The low frequency conversion of the signal $Y_H$ is known as the APC process. Firstly, a horizontal synchronizing signal whose frequency is $f_H$ is extracted from the reproduced Y signal by the synchronizing signal separator 27.

The PLL 26 responds to the synchronizing signal to produce a continuous signal whose frequency is $40 f_H$. The color burst extracting circuit 28 extracts a color burst having frequency $f_{sc}$ from the reproduced Y signal. The PLL 29 produces a continuous signal whose frequency is $(f_{sc}+\Delta f)$ where $\Delta f$ is a possible frequency deviation of the color burst of the reproduced signal $Y_H$. The outputs of the PLL circuits are added to each other by the frequency converter 30 and then added to the $Y_H'$ signal by the frequency converter 23, resulting in $(f_{sc}+\Delta f+40f_H)$.

Since the signal $Y_H'$ of $40 f_H$ supplied also contains the frequency deviation $\Delta f$, i.e., $(40 f_H+\Delta f)$, a frequency after frequency-conversion becomes stable since $$(40 f_H+f_{sc}+\Delta f)-(40 f_H+\Delta f)=f_{sc}$$

and thus it is possible to obtain an exact signal frequency $f_{sc}$ even if the color burst frequency varies by $\Delta f$. This is because the PLL 29 operates such that the color burst frequency from the color burst extraction circuit 28 is made correspondent to the sub-carrier of 3.579545 MHz (NTSC) of the output frequency of the reference frequency generator 31.

According to the circuit construction shown in FIG. 1, the phase difference between the signals $Y_L$ and $Y_H$ is removed, so that a video signal of high resolution can be recorded and reproduced. Although the pilot signal is inserted into the horizontal scan period included in the vertical blanking period, it may be inserted into a plurality of horizontal scan periods as in the form of a burst. In such case, the influence of signal dropout may be avoided. Further, it may be inserted continuously at a level which is low enough to avoid interference to the video image.

Further, it should be noted that the phase shift (PS) or the phase inversion (PI) which is employed for the guard bandless recording is also applicable to the circuit construction shown in FIG. 1.

Figure 4:
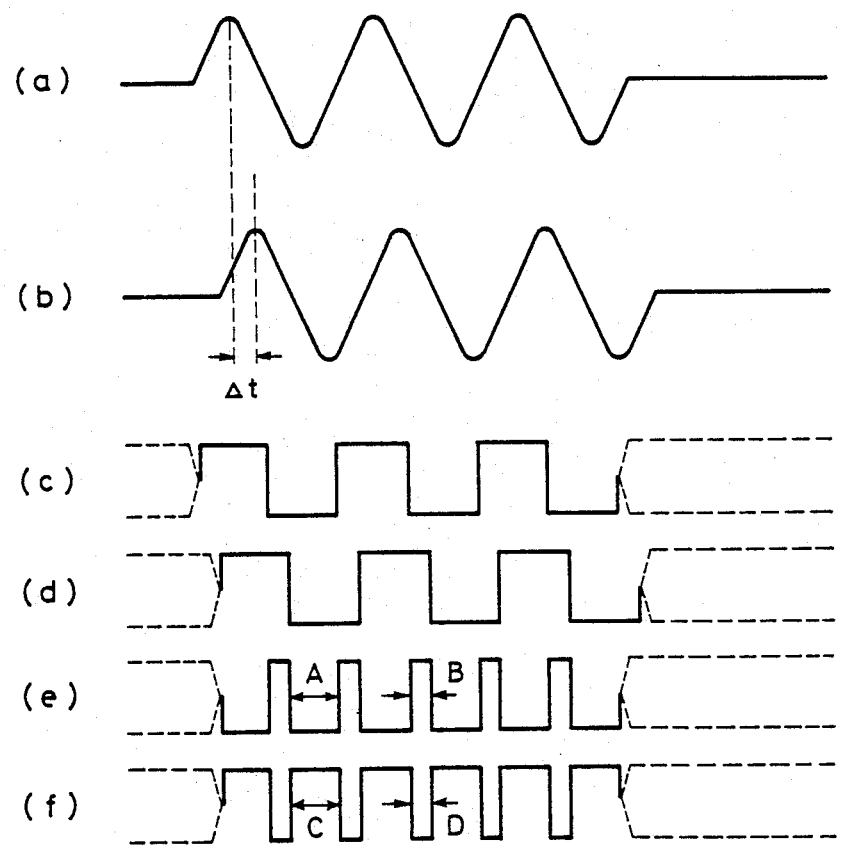
FIG. 4, (a) through (f) is a timing chart showing an example of a polarity/delay time difference detector according to the present invention.
Figure 5:
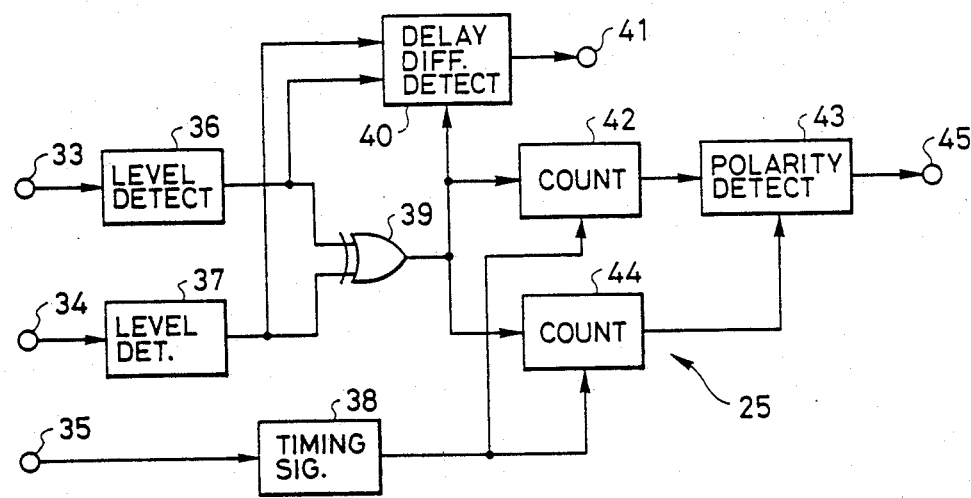
FIG. 5 is a block circuit diagram of the difference detector in FIG. 4.
Figure 6:
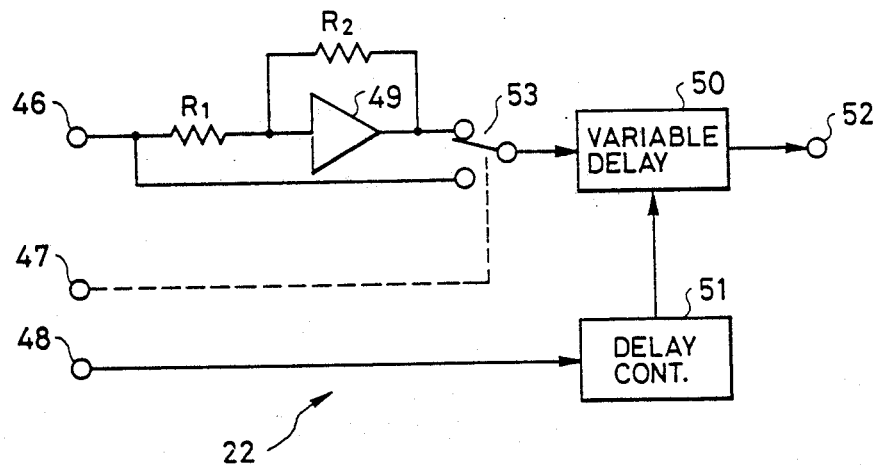
FIG. 6 is a block circuit diagram showing an example of a polarity/delay time difference regulator according to the present invention.

FIG. 4 shows a timing chart of operation of the phase difference detecting circuit 25, FIG. 5 is a block diagram of the detecting circuit 25 and FIG. 6 is a block circuit diagram of the phase regulating circuit 22.

In FIG. 5, the detecting circuit 25 comprises level detectors 36 and 37, a delay time difference detecting circuit 40, counters 42 and 44, a phase or polarity detecting circuit 43, a timing signal generator 38 and an exclusive OR gate 39.

As operation of the circuit 25 will be described with reference to FIG. 4. The signal $Y_L$ (waveform a) which has passed through the frequency demodulator 21 is supplied to an input terminal 33 of the level detector 36. The $Y_L$ is sliced at zero level by the detector 36 as shown by waveform c.

The signal $Y_H$ (waveform b) which has passed through the low frequency conversion system is applied to an input terminal 34 of the level detector 37 and sliced at zero level thereby as shown by waveform d. It is assumed in FIG. 4 that the signal $Y_H$ is in phase with the signal $Y_L$ and is delayed from the latter by $\Delta t$. With such assumption, an output of the exclusive OR gate 39 is high level only for the time $\Delta t$ as shown by a portion of waveform c indicated by a letter B and is low level for the remaining time as shown by a letter A. The counters 42 and 44 count occurrences of high level and low level, respectively. The phase detecting circuit 43 decides phases of the signals being coincident to each other if a total time of the low level is longer than that of the high level and not coincident otherwise. The decision of the phase detector 43 is provided at an output terminal 45 connected to a phase input 47 of the regulation circuit 22.

The delay time difference detector 40 detects a delay time difference between the level detectors 36 and 37 by detecting leading or trailing edges of output signals thereof and a detected difference is provided at an output terminal 41 thereof connected to a delay input 48 of the regulation circuit 22. The detection is performed under control of the timing generator 38 responsive to the synchronizing signal supplied to the input terminal 35.

The regulation circuit 22 for regulating phase and delay time, shown in FIG. 6, comprises an inversion amplifier 49 connected through a resister R1 to an input terminal 46 connected to the point 34 and having a feedback resister R2, a switch 53, a variable delay element 50 such as CCD or BBD connectable through the switch 53 to either an output of the amplifier 49 or an input terminal 46 directly and a delay control circuit 51. The phase control is performed by controlling the switch 53 by a signal appearing at the output terminal 45 of the detector 25 connected to the phase input terminal 47 and the delay time difference control is performed by controlling clock frequency to be supplied to the delay element 50 by means of the delay control circuit 51 such that the element 50 provides a delay corresponding to the delay time difference given to the delay time difference input terminal 48 connected to the output 41 of the detector 25. In this embodiment, although the delay difference control is of a feedforward type, it may be of a feedback type.

Contrary to the mentioned situation in which the signals $Y_L$ and $Y_H$ are in phase, it is now assumed that the signal $Y_L$ and $Y_H$ are out of phase, i.e., the signal $Y_H$ is inverted with respect to the signal $Y_L$.

Since the signal $Y_L$ belongs to the frequency modulator system and is not influenced by direction of the head winding etc., the phase or polarity of it is determined when the circuit construction is determined. On the other hand, the polarity of the signal $Y_H$ changes when the direction of the head winding is reversed during mounting of the head. In such case, the polarity is detected by detecting that a high level time (C) of the waveform f is longer than a low level time (D) thereof as shown in FIG. 4.

Since the pilot signal is passed through both the FM system and the low frequency conversion system, it is possible to detect with a simplified circuit, the phase and delay time differences introduced thereat due to the difference in characteristics between the two systems. It is of course, possible to use a frequency around the center frequency of the signal $Y_L$ or $Y_H$ as the pilot signal.

The reason why the phase difference regulator 22 is inserted into the signal $Y_H$ system is that the signal phase tends to be changed in the $Y_H$ signal system rather than the $Y_L$ signal system for the reasons mentioned previously.

Figure 7:
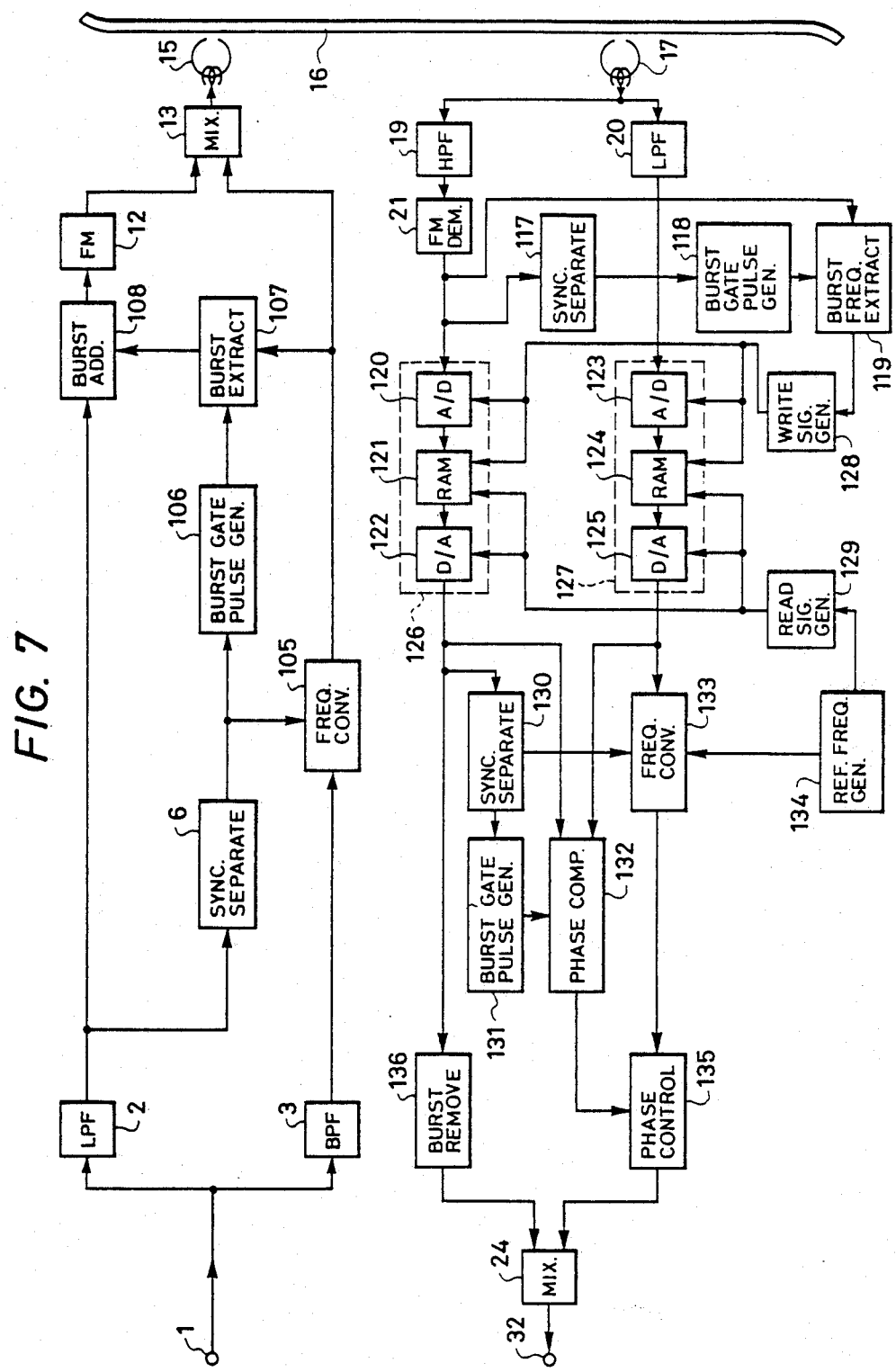
FIG. 7 is a block circuit diagram of another embodiment of the present invention.

FIG. 7 shows another embodiment of the present invention, in which a color burst is used as the additional signal to obtain a highly continuous luminance signal over the full frequency range thereof. In FIG. 7, the embodiment comprises a recording system including an LPF 2 connected to a video signal input terminal 1, a BPF 3 connected in parallel to the LPF 2, a synchronizing signal separator 6, a frequency converter 105, a burst gate pulse generator 106 for generating a gate pulse signal from the synchronizing signal for a time width corresponding to a color burst period, a burst extracter 107 for extracting a signal for the burst period, a burst introducing circuit 108, an FM circuit 12, a mixer 13 and a recording head 15 and a reproducing system including a reproducing head 17, a high pass filter (HPF) 19, an LPF 20, a frequency demodulator 21, a synchronizing signal separator 117, a burst gate pulse generator 118, a burst frequency extracter 119 for extracting frequency components for the burst period, first and second time base correctors 126 and 127, a write signal generator 128, a read signal generator 129, a synchronizing signal separator 130, a burst gate pulse generator 131, a phase comparator 132, a frequency converter 133, a reference frequency generator 134, a variable phase control 135 for varying input signal phase according to a control signal, a burst remover 136 and a mixer 137 connected to a video output terminal 32. The first time base corrector 126 comprises an A/D converter 120, a memory 121 and a D/A converter 122 and the second time base corrector 127 comprises an A/D converter 123, a memory 124 and a D/A converter 125.

An operation of this embodiment will be described with reference to FIG. 8 which shows signal waveforms at various points of the embodiment and FIG. 9 which shows details of the frequency converter 105 of the recording system and the frequency converter 133 of the reproducing system. The converter 105 comprising a frequency-multiplier 142 for multiplying frequency by 40, a phase-shifter (PS) 143, a frequency conversion unit 144, a BPF 145, a burst gate pulse generator 146, a burst extracter 147, a PLL oscillator 148 and a frequency conversion unit 149.

Figure 8:
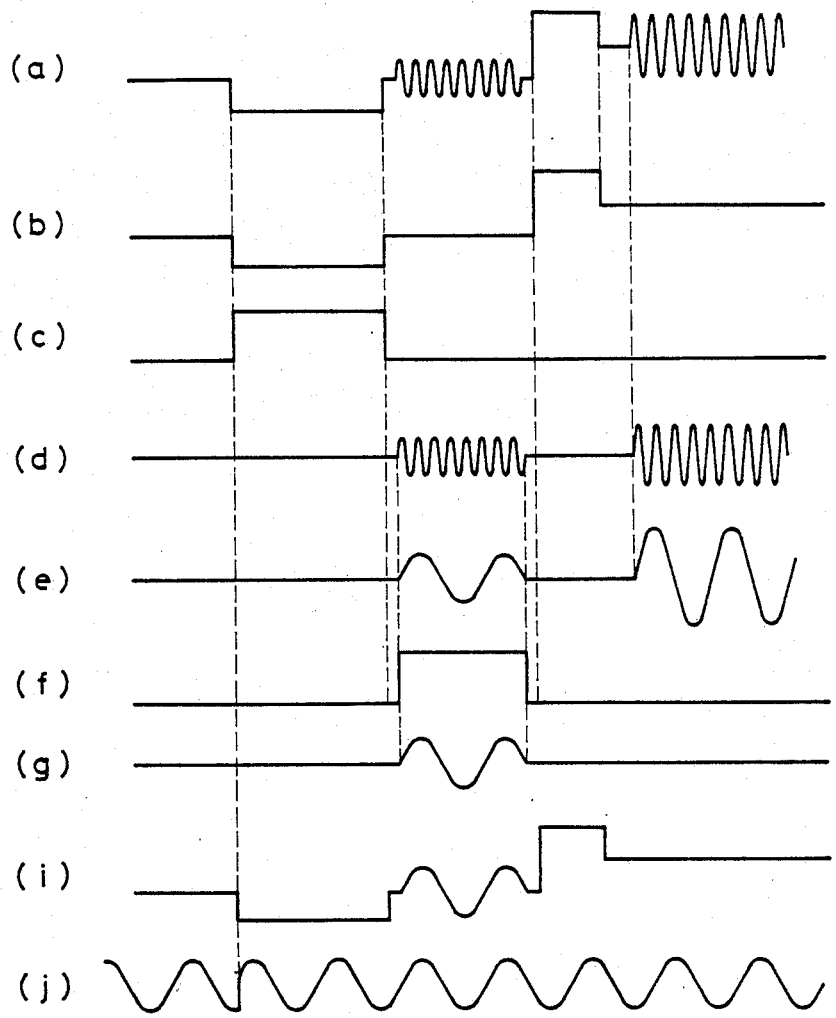
FIG. 8 shows waveforms (a) through (j) for explanation of operation of the embodiment in FIG. 7.

A video signal, e.g., NTSC color video signal Y, having a waveform a in FIG. 8 and supplied to the input terminal 1 is divided in frequency into a low frequency band and a high frequency band by the LPF 2 and the BPF 3, respectively.

The low frequency luminance signal $Y_L$ (waveform b) from the LPF 2 is supplied to the synchronizing signal separator 6 and to the burst signal adder 108. The synchronizing signal separator 6 extracts a synchronizing signal (waveform c) from the signal $Y_L$ and supplies it to the frequency converter 105 and the burst gate pulse generator 106. In FIG. 9, the high frequency signal $Y_H$ (waveform d) from the BPF 3 is supplied to the burst extracter 147 and the frequency conversion unit 149 of the frequency converter 105.

The signal c of frequency $f_H$ from the horizontal synchronizing signal separator 6 is frequency-multiplied by the frequency multiplier 142 by 40 and a resultant signal having frequency $40 f_H$ is PS processed by the PS processor 143, which is supplied to the frequency conversion unit 144. The burst component of the signal d from the BPF 3 is extracted by the burst extractor 147 according to the burst gate pulse from the burst gate pulse generator 146 and is supplied to the PLL 148 to produce a color sub-carrier of $f_{sc}$ which is supplied to the frequency conversion unit 144.

The burst gate pulse generator 146 delays the signal e on the basis of the synchronizing signal c in FIG. 8 to obtain a signal f indicative of a color burst period substantially which is supplied to the burst extracting circuit 107. The extracting circuit 107 extracts the signal f from the output signal of the frequency converter 149 according to an output control signal from the burst gate pulse generator 146 and supplies the signal g to the burst adder 108.

In the burst adder 108, the output signal b of the LPF 2 is added to the output signal g of the burst extraction circuit 107 to produce a signal i which is supplied to the FM circuit 12 and frequency-modulated therein. A resultant frequency-modulated signal is added to the signal e from the frequency converter 149 in the adder 13 and a resultant signal is recorded on the magnetic tape 16 through the head 15.

Thus, among the signals passing through the frequency conversion circuit 105, only the signal corresponding to those substantially existing in the color burst period, i.e., the low frequency conversion signal itself in this embodiment, is added to the FM system signal for recordation.

In reproducing operation, a signal detected by the magnetic head 17 is passed through the HPF 19 and the LPF 20, respectively. An output of the HPF 19 is frequency-demodulated by the demodulator 21 whose output, i.e., the low frequency luminance signal, is supplied to the first TBC 126, the synchronizing signal separator 117 and the burst frequency extractor 119. An output of the LPF 20, i.e., the low frequency converted component, is supplied to the second TBC 127.

An output signal of the separator 117 which corresponds to the signal c in FIG. 8 is supplied to the burst gate pulse generator 118 to produce a signal indicative of the burst period which corresponds to the signal f in FIG. 8 and which is supplied to the burst frequency extractor 119. The latter extracts a signal corresponding to the signal g in FIG. 8 from the reproduced low frequency converted luminance signal corresponding to the signal i in FIG. 8 on the basis of the output signal of the burst gate pulse generator 118 and supplies it to the write signal forming circuit 128.

The write signal forming circuit 128 produces, on the basis of the reproduced burst signal from the burst frequency extractor 119, a continuous burst signal j in FIG. 8 and then produces a write clock signal by multiplying the signal j The write clock signal is supplied to the A/D converters 120 and 123 and the memories 121 and 124 of the first and second time base correctors 126 and 127, respectively.

The read signal forming circuit 129 responds to a reference signal from the reference frequency generator 134 to produce a read clock signal which is supplied to the D/A converters 122 and 125 and the memories 121 and 124 of the first and second time base correctors 126 and 127, respectively.

In the first and second TBCs 126 and 127, the respective reproduced signals are sampled by the A/D converters 120 and 123 thereof with the write clock signal, and, the sampled data are stored in predetermined addresses of the RAMs 121 and 124, respectively. Then, the data of the RAMs are readout sequentially with the read clock from the reference frequency generator 134 and D/A converted by the D/A converters 122 and 125, respectively. Therefore, even if the data are stored randomly in time, the readout thereof is performed by the read clock signal orderly in time, so that phase difference between readout data is eliminated.

Figure 9:
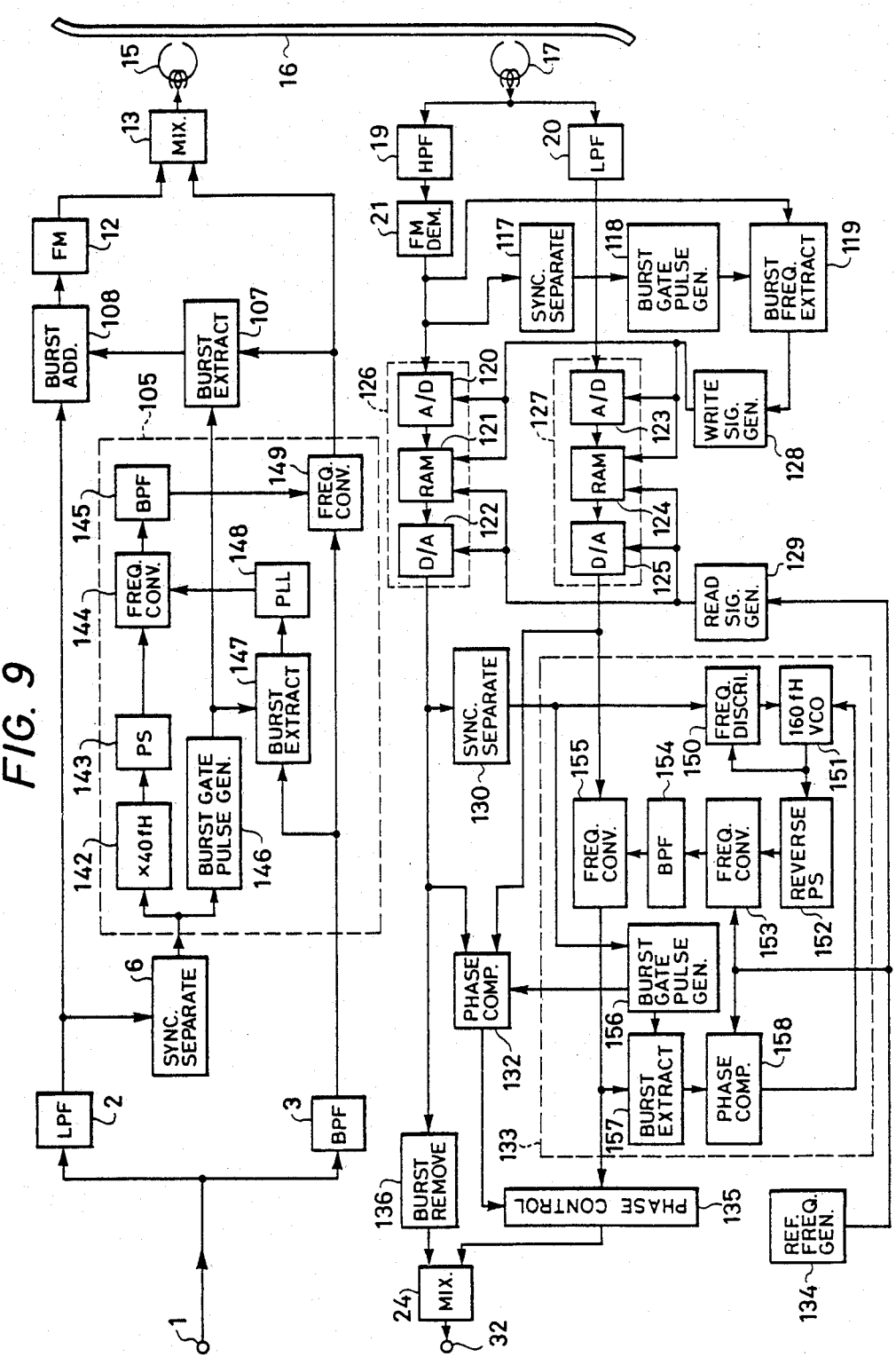
FIG. 9 is a block circuit diagram of a further embodiment of the present; invention.

The frequency converter 133 comprises a frequency discriminator 150 having an input connected to the output of the synchronizing signal separator 130, a voltage controlled oscillator (VCO) 151 responsive to the output signal of the frequency discriminator 150 to produce a signal having frequency of $160 \times f_H$, a reverse PS processor 152 for performing the same operation of that of the PS processor 143 of the recording system in reverse manner, a BPF 154 connected to the frequency conversion unit 153, a frequency conversion unit 155 connected to the BPF 154, a burst gate pulse generator 156, a burst extractor 157 connected to the burst gate pulse generator 156, a phase comparator 158 connected to the burst extractor 157 and the reference frequency generator 134 as shown in FIG. 9.

The function of the frequency converter 155 is to frequency-convert the low frequency converted signal from the second TBC 127 to the original sub-carrier frequency band by performing a reverse operation to that performed by the frequency converter 105 in the recording system.

Thus, although the reproduced burst signal contains time base variations produced in the magnetic recording/reproducing systems as information, such time base variations are removed by the above signal processing.

Since the signal g to be added can be regulated up to a maximum permissible input level of the FM circuit 12, i.e., from a sink level to 100% white level (in case where an upper and lower clips are provided, from the lower clip level to the upper clip level.). This means that it is possible to obtain reproduced burst signal of high S/N ratio and to realize high precision time base correction.

The burst signal in the low frequency converted luminance signal from the first TBC 126 is removed by the burst remover 136, resulting in the same low frequency converted luminance signal as the signal b in FIG. 8. The reproduced low frequency converted signal from the second TBC 127 is frequency-converted by the frequency converter 153 to obtain the original sub-carrier frequency band.

Figure 10:
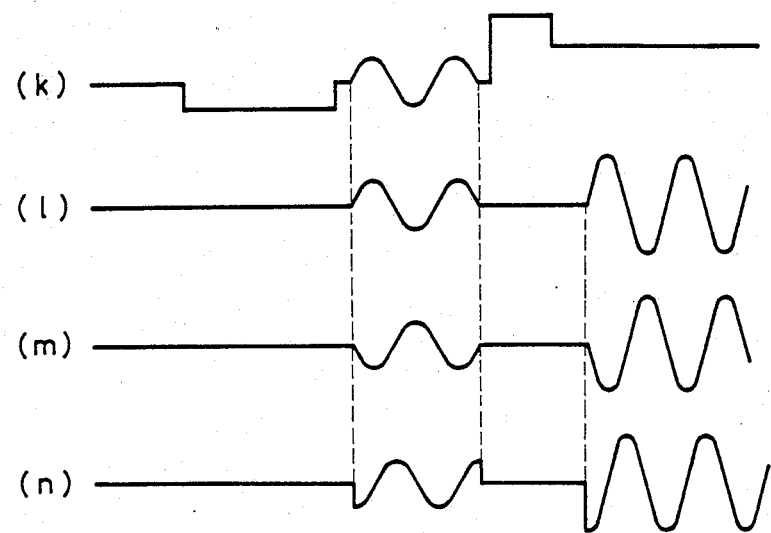
FIG. 10 show (h) and (n) waveforms of output signals of time base converters in FIG. 9.

The output signal of the first TBC 126 is not always in phase with the output signals of the second TBC 127 due to characteristics of the recording system and the reproducing system. Waveform k in FIG. 10 shows the output signal of the first TBC 126 and the output signal of the second TBC 127 may be shown by either of waveforms b, c or d. That is, the waveform b is in phase with the waveform a, the waveform c is out of phase by 90° and the waveform d is out of phase by an angle smaller than 90°. For example, phase difference between the output signals of the TBCs 126 and 127 may become 180° depending upon the winding direction of the magnetic head coil.

In this embodiment, in order to avoid such problem, the synchronizing signal is extracted from the output signal of the first TBC 126 by the synchronizing signal separator 130 and the signal indicative of the burst period is produced by the burst gate pulse generator 156 on the basis of the synchronizing signal. The output of the generator 156 and the second TBC 127 are supplied to the phase comparator 132. In the latter, the signal components of the output signals of the first and second TBCs 126 and 127, which are within the burst period are compared in phase and a resultant phase difference is supplied to the phase control circuit 132, so that the reproduced signal corresponding to the waveform d in FIG. 8 is controlled in phase such that the reproduced signal $Y_L$ becomes in phase with the reproduced $Y_H$ signal.

Thus, in the reproduced video signal mixed in the mixer 24, the phase continuity between the signal $Y_L$ and the signal $Y_H$ is recovered, resulting in a highly precise, high resolution image.

Figure 11:
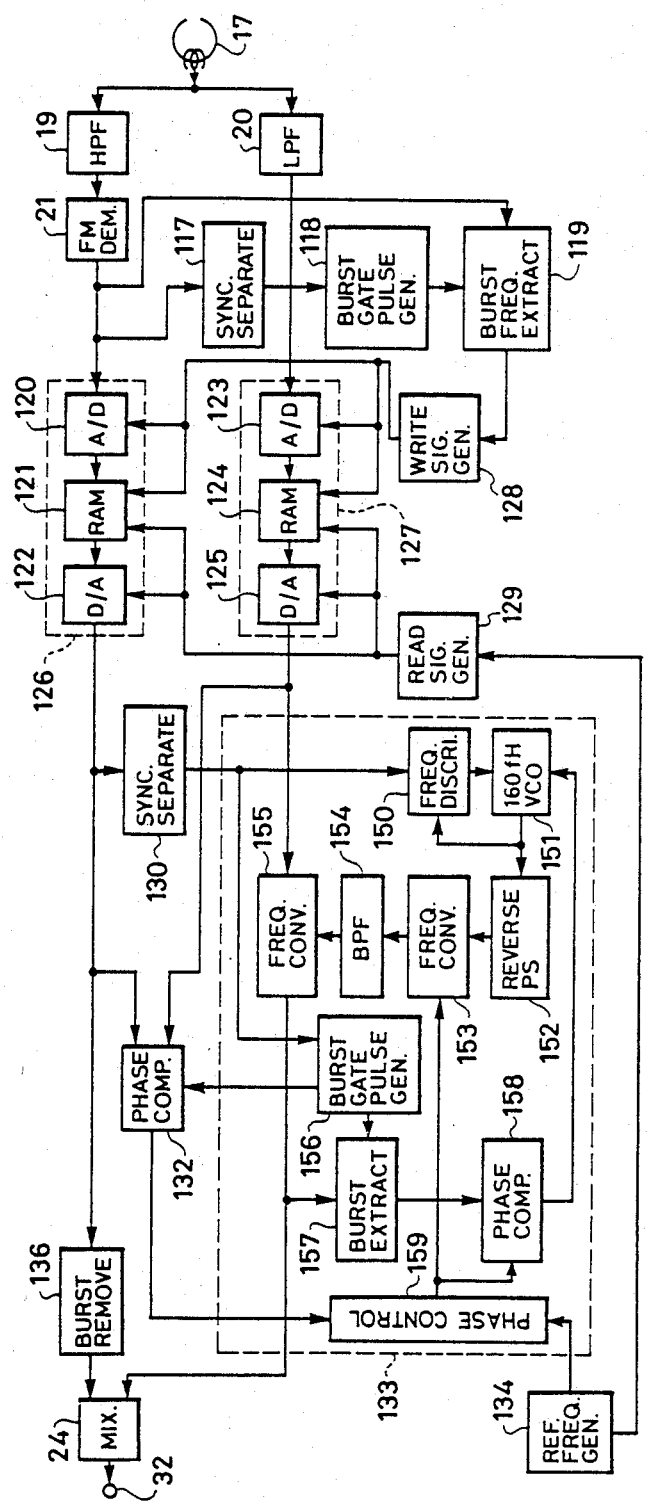
FIG. 11 is a block diagram of a still further embodiment of the present invention.

FIG. 11 shows another embodiment of the reproducing system of the present invention. In FIG. 11, a phase control circuit 159 is provided instead of the phase control circuit 135 in FIG. 9, which responds to the phase difference signal from a phase comparator 132 to change the phase of the sub-carrier produced by the reference frequency generator 134 so that the reproduced $Y_H$ signal from the frequency converter 55 is made in phase with the signal $Y_L$ without operating the reproduced $Y_H$ signal itself.

Figure 12:
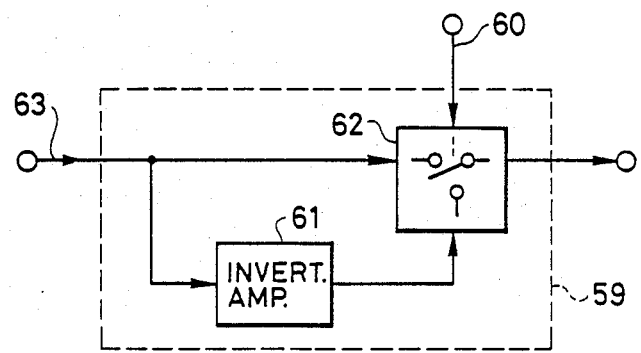
FIGS. 12 and 13 show circuit diagrams of a variable phase control circuit used in the embodiments in FIGS. 7 and 10, respectively.

FIG. 12 shows the phase control circuit 159 (or 135) shown in FIGS. 7, 9 and 11, in detail.

In FIG. 12, the phase control circuit 159 comprises a inversion amplifier 161 having an input connected to the output of the reference frequency 134 and a switching circuit 162 having an input connected to the output of the phase comparator 132, a second input connected to an output of the inversion amplifier 161, a third input connected to the output of the reference frequency generator 134 and an output connected to the phase comparator 158 and the frequency conversion unit 153. The switching circuit 162 responds to the output signal of the phase comparator 132 to decide whether the reference frequency signal from the generator 134 is passed to the comparator 158 and the frequency conversion unit 153 directly or the reference frequency signal is inverted in phase and then passed to them.

Figure 13:
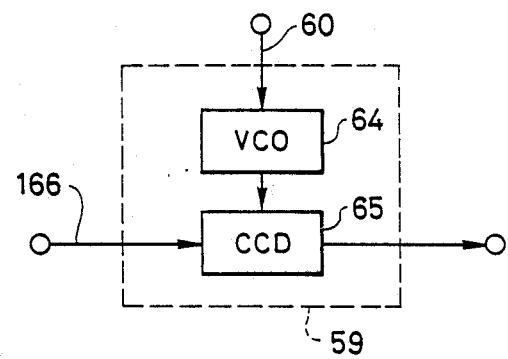

FIG. 13 shows a detail of another embodiment of the phase control circuit 159, which comprises a voltage controlled oscillator 164 having an input connected to the phase comparator 132 and a charge coupled device (CCD) 165 having an input connected to the reference frequency generator 134, a second input connected to an output of the VCO 164 and an output connected to the phase comparator 158 and the frequency conversion unit 153. The VCO 164 responds to a voltage of the output of the phase comparator 132 to produce a frequency signal corresponding thereto and the CCD 165 responds to the output frequency of the VCO 164 to provide a time delay corresponding thereto to the reference frequency signal from the generator 134, so that the phase of the reference frequency signal from the generator 134 can be controlled continuously upon the phase difference detected by the phase comparator 132.

It should be noted at this time that although in the embodiments shown in FIGS. 7, 9 and 11 the write clock for the first and second TBCs 86 and 87 is produced by using the reproduced burst signal in the FM system signal, it may be possible to use the reproduced burst signal in the low frequency-conversion system signal for the same purpose.

Figure 14:
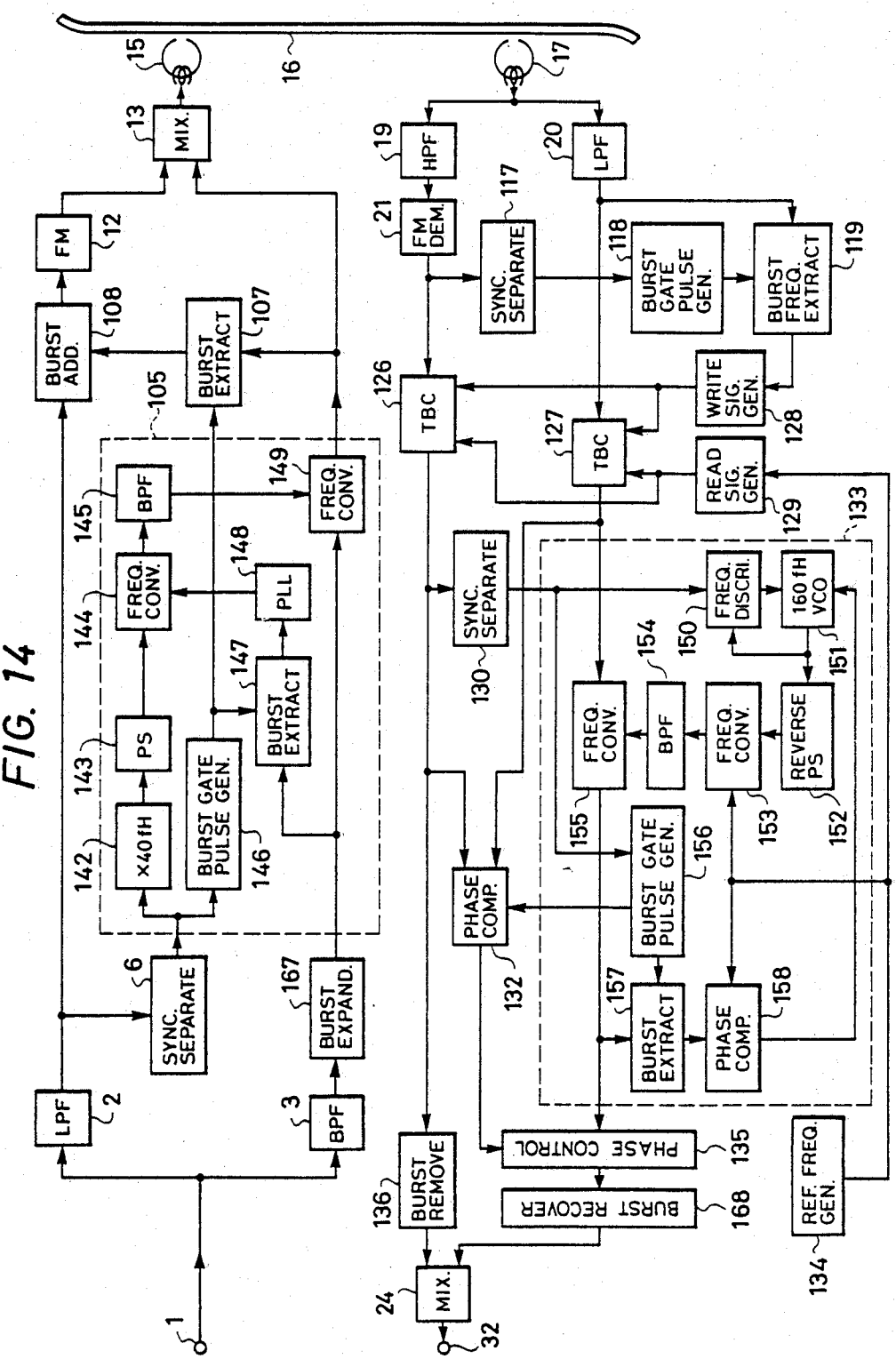
FIGS. 14, 15, 16 and 17 show other embodiments of the present invention, respectively.
Figure 15:
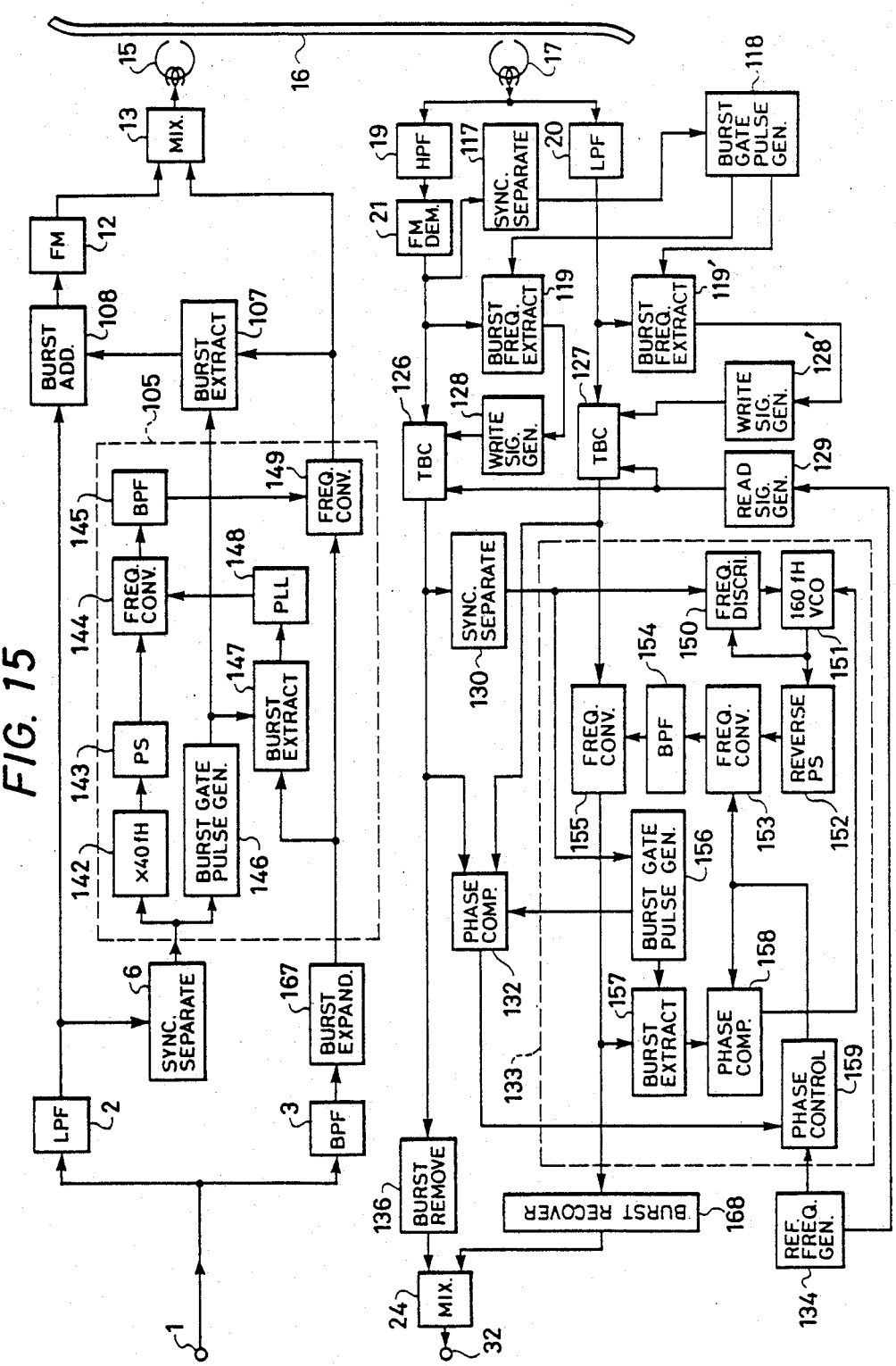

FIGS. 14 and 15 show other embodiments respectively, in which the color burst signal is expanded in time in the recording system to improve the function of the time base correctors.

In FIG. 14, a burst signal expansion circuit 167 is inserted between the BPF 3 and the frequency converter 105 in the recording system and a burst recovery circuit 168 is inserted between the phase control circuit 135 and the mixer 24 in the reproducing system. Since in this embodiment, the burst signal of the low frequency conversion system in the recording system is expanded in time by the burst signal expansion circuit 167, the TBCs in the reproducing system becomes capable of detecting time base correction precisely by supplying the output of the LPF 20 to the frequency extractor 119 and obtaining the write clock from the burst signal in the low frequency conversion system with an improvement of S/N ratio of the chrominance signal.

The embodiment shown in FIG. 15 is provided with the write clock producing circuit for each of the TBCs, in addition to the burst signal expansion in the recording system and the burst signal recovery circuit in the reproducing system in FIG. 14. That is, the write clocks for the TBCs 126 and 127 are produced by extracting the burst signals from the respective signal systems and, therefore, the time base correction for the respective signal systems are obtained separately with high precision.

Although, in the embodiments described hereinbefore, the signal portion of the output signal of the frequency converter 105 which falls within the burst period is directly added to the low frequency converted luminance signal in the recording system, other signals may be added thereto instead of the output signal portion of the frequency converter 105 provided that such other signal has a certain fixed correspondency to the output signal portion of the frequency converter 105 since the burst signal can be recovered therefrom on the basis of the correspondency for phase comparison in the reproducing system.

Figure 16:
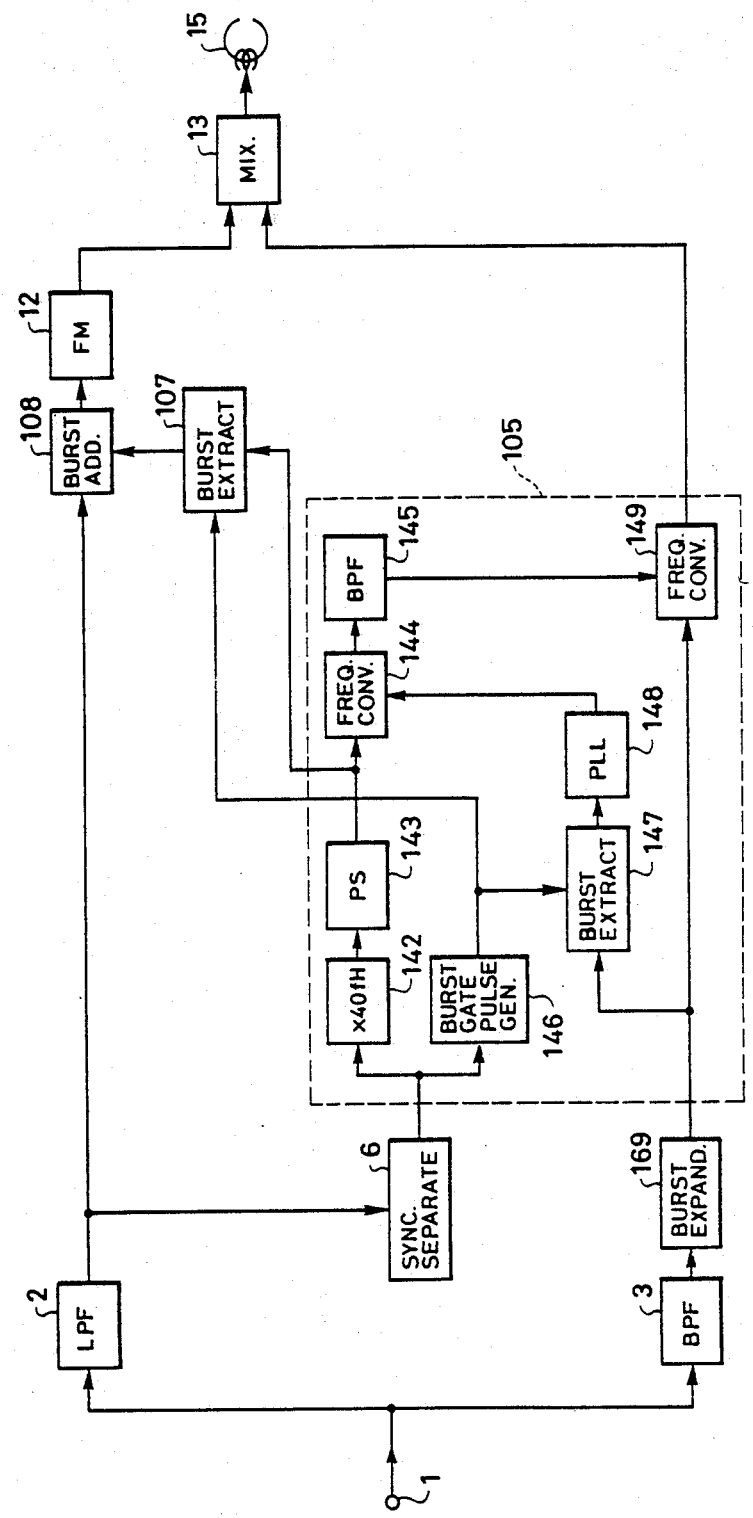

FIG. 16 shows an example of the use of such other signal. In FIG. 16 the PS processed, $40 \times f_H$ signal from the PS processor 143 of the frequency converter 105 is derived by the burst extractor 107 and added to the low frequency chrominance signal in the burst adder 108. In this case, due to the existence of the burst signal expansion circuit 167, the output signal of the burst gate pulse generator 146 should be expanded in time suitably.

Figure 18:
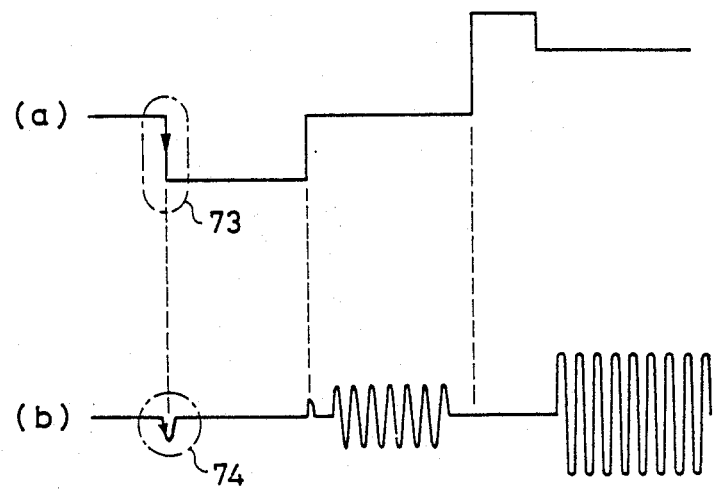
FIG. 18 (a) and (b) show waveforms for explanation of operation of the embodiment in FIG. 17.
Figure 17:
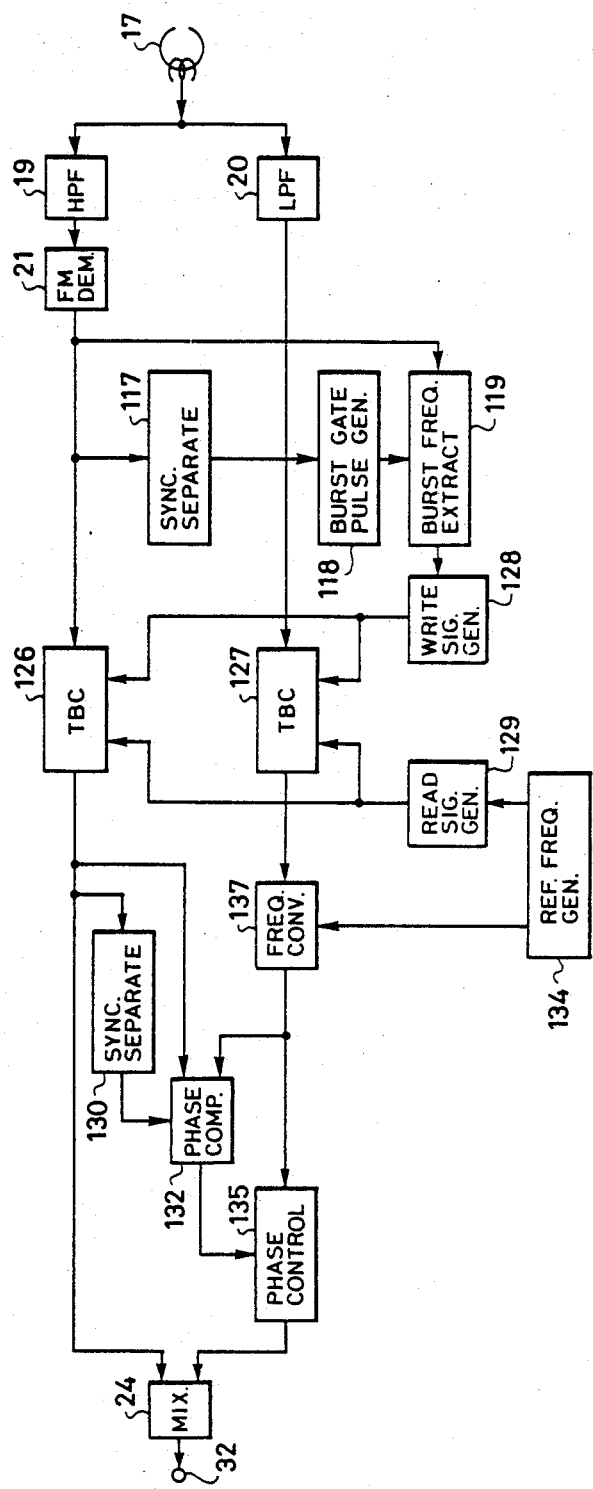

In the embodiments mentioned hereinbefore, one of the inputs of the phase comparator 132 of the reproducing system is the burst signal added thereto in the recording system. However, it may be possible to obtain the phase difference signal from the comparator 132 by using a signal other than the added burst signal for the input of the comparator. FIG. 17 shows an example of the use of such other signal, in which the comparator 132 compares, in polarity, a falling edge 173 (FIG. 18) of the synchronizing signal of the reproduced low frequency luminance signal with a synchronizing portion of the reproduced signal 174 (FIG. 18) in the low frequency conversion system, according to the synchronizing portion from the synchronizing signal separator 130 and controls the phase control circuit 135 with an output of the phase comparator 132.

As described hereinbefore, according to the present invention, the reproduced luminance signal characteristics becomes continuous over the frequency range thereof, resulting in a high resolution video image. Although the present invention has been described as being applied to the VTR using magnetic tape as the recording medium, it should be noted that it can be applied to a recording/reproducing apparatus using an optical disc as the recording medium.

What is claimed is:

1. A video signal recording/reproducing device comprising:
    means for dividing a video signal into at least a high frequency band and a low frequency band;
    means for frequency-modulating a signal component of said low frequency band;
    first frequency conversion means for frequency-converting a signal component of said high frequency band to a low frequency;
    means for recording an output of said frequency modulating means and an output of said first frequency conversion means on a recording medium;
    means for reproducing said recorded outputs of said frequency modulating means and said first frequency conversion means;
    second frequency conversion means for frequency-conversing a low frequency converted component of said reproduced signal;
    means for demodulating said frequency modulated signal component;
    means for adding an output of said second frequency conversion means to an output of said frequency demodulating means;
    means for recording an additional signal on said recording medium;
    means for reproducing said additional signal recorded on said recording medium;
    means responsive to said reproduced additional signal for detecting a phase difference between a recording system including said first frequency conversion means and said video signal recording means and a reproducing system including said second frequency conversion means and said video signal reproducing means;
    means for regulating said detected phase difference; and
    control means responsive to an output of said detecting means for controlling said regulating means to correct said detected phase difference.

2. The video signal recording/reproducing device as claimed in claim 1, wherein said additional signal is a pilot signal inserted in a horizontal synchronizing signal portion of the video signal within a vertical blanking period.

3. The video signal recording/reproducing device as claimed in claim 2, wherein said dividing means comprises a first filter for passing said low frequency band signal component and a second filter for passing said high frequency band signal component, said pilot signal having a frequency around an upper cut-off frequency of said first filter and a lower-cut-off frequency of said second filter.

4. The video signal recording/reproducing device as claimed in claim 2 or 3, wherein said pilot signal recording means comprises a circuit for supplying said pilot signal to said dividing means and recording said pilot signal on said recording medium through said dividing means.

5. A video signal recording/reproducing system comprising:
  means for dividing a composite color video signal into a low frequency luminance signal component and a high frequency luminance signal component including a chrominance signal component;
  means for frequency-modulating said low frequency luminance signal component;
  a first means for frequency-converting said high frequency luminance signal component including said chrominance signal component;
  recording means for recording outputs of said frequency-converting means and said frequency modulating means on a magnetic recording medium;
  means for detecting said recorded signals;
  a second means for frequency-converting a low frequency converted component of said detected signal;
  means for frequency-demodulating said frequency modulated component of said detected signal;
  means for adding and outputting the outputs of said second frequency converting means and said frequency demodulating means;
  phase comparing means provided in said reproducing system for comparing a phase between a reproduced high frequency luminance signal component and a reproduced low frequency luminance signal component; and
  phase control means responsive to an output of said phase comparing means for variably controlling a phase of said second frequency converting means of said reproducing system, wherein said phase comparing means compares the output of said frequency demodulating means with the output of said second frequency converting means upon which said reproduced low frequency luminance signal is made in phase with said reproduced high frequency luminance signal.

6. The video signal recording/reproducing system as claimed in claim 5, wherein said recording system includes means for extracting a signal portion of said output of said first frequency converting means which falls substantially within a burst period and means for adding a signal corresponding to an output signal of said extracting means to said low frequency signal, said phase comparing means comparing the outputs of said frequency demodulating means and said second frequency converting means substantially during said burst period.

7. The video signal recording/reproducing system as claimed in claim 5 or 6, further comprising a time base correction means for correcting time base variations of said reproduced low frequency luminance signal and said reproduced high frequency luminance signal and a first extracting means for extracting a signal component of said reproduced low frequency luminance signal component which falls substantially within said burst period, wherein an input operation of said time base correcting means is controlled according to an output of said first extracting means.

8. The video signal recording/reproducing system as claimed in claim 5 or 6, further comprising means for expanding said signal portion of said high frequency signal which falls substantially within said burst period in said recording system in time, time base correcting means for correcting times bases of said low frequency luminance signal and said low frequency converted signal in said reproducing system and extracting means for extracting said signal component of said reproduced low frequency converted signal which falls substantially within said expanded burst period.

* * * * *